June 13, 1967　　　K. F. MILLER ET AL　　　3,324,728
PRESSURE TRANSDUCER
Filed March 10, 1965　　　　　　　　　　　　2 Sheets-Sheet 1
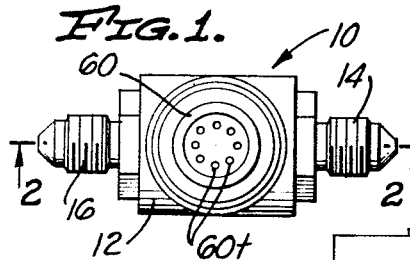
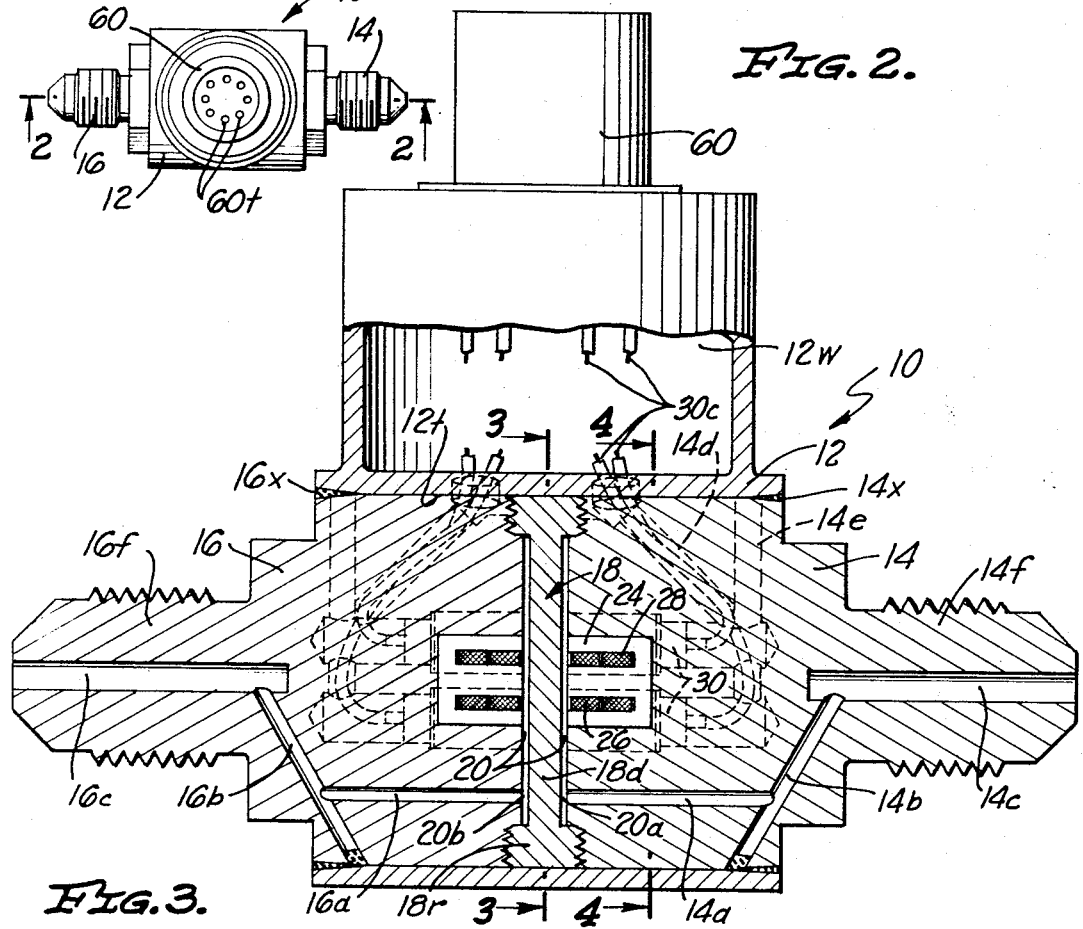
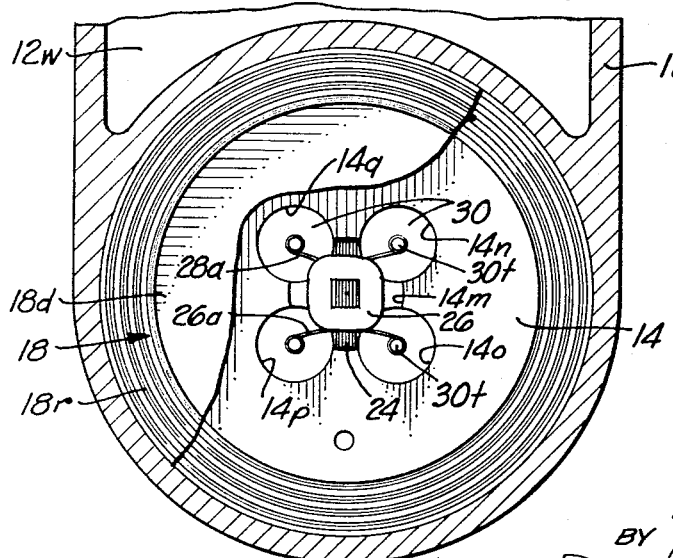
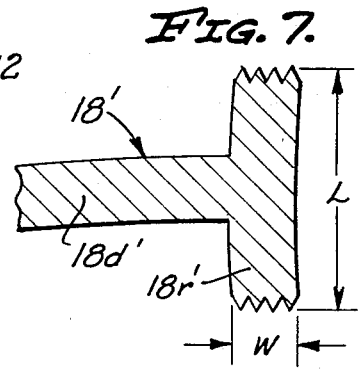
INVENTORS
KENNETH F. MILLER,
MELVIN H. SMITH
BY June 13, 1967  K. F. MILLER ET AL  3,324,728
PRESSURE TRANSDUCER Filed March 10, 1965  2 Sheets-Sheet 2

INVENTORS
KENNETH F. MILLER,
MELVIN H. SMITH
BY

3,324,728
PRESSURE TRANSDUCER
Kenneth F. Miller, Riverside, and Melvin H. Smith, Perris, Calif., assignors to Bourns, Inc.
Filed Mar. 10, 1965, Ser. No. 438,605
8 Claims. (Cl. 73—398)

ABSTRACT OF THE DISCLOSURE

A diaphragm-type pressure transducer adapter for very accurate transduction of pressure variations in a fluid under high pressure with elimination of errors attributable to relative movements of parts of the transducer as for example inward radial creep of the outer annular portion of the diaphragm, the transducer comprising a diaphragm device having an elastic central portion encircled by a rigid annular cylindrical ring-like outer portion having annular end faces and said outer portion intermmediate its end faces being integral with the central portion around the periphery of the latter and having at the ends of the outer portion respective accurately formed thread-like formations, the transducer further having end members having opposed end faces each having an annular face portion having an accurately formed thread-like formation complementary to a respective formation on an end face of the outer portion of the diaphragm device, and the transducer having means whereby the complementary thread-like formations are tightly engaged under high compressive stress by preloading, whereby the interengaged thread-like formations provide an effective fluid-tight seal around the periphery of the diaphragm device and whereby radial creep of the diaphragm portion outwardly of the central elastic pressure-sensing deformable portion of the diaphragm device is prevented.

---

The invention herein disclosed pertains to pressure transducers of the type in which an elastic diaphragm is employed as a pressure-sensitive element that is elastically deformed from a normally flat condition incident to a pressure differential between fluids acting on opposite faces of the diaphragm. More particularly the invention relates to a means and method whereby inaccuracies or errors due to undesirable relative movements of parts of the transducer are substantially entirely eliminated or obviated.

As is well understood in the pressure transducer art, instruments employing a diaphragm as a sensor are of a variety of forms, and are variously constructed to indicate absolute pressure, gage pressure, and differential pressure. Further, deformation of the pressure-sensitive diaphragm by the fluid-pressure differential is employed variously to operate a variety of types of means for translating diaphragm movement or motion into electrical signals representative of pressure changes. For example, some such transducers employ potentiometer devices for such translation, whereas some utilize capacitor means, and others utilize inductive means for creating pressure-representing signals.

In general, the pressure-sensitive diaphragm comprised in transducers of the type here of interest is in the form of a flat disc that is disposed between opposed members or devices that are arranged to hold the diaphragm in place and create and maintain a fluid-tight juncture around the outer portion of the diaphragm. In the case of transducers adapted for measurements in the higher pressure ranges, the diaphragm is customarily welded to supporting structure around the periphery whereby a fluid-tight seal is provided. In lower pressure ranges, conventional gasket or O-ring seals may ordinarily be utilized. Transducers according to the invention are adapted to be employed in measuring pressures in the higher pressure ranges, with superior accuracy and linearity and without the usually experienced inaccuracies caused by diaphragm slippage or creeping. Further, a transducer according to one aspect of the invention may be disassembled and reassembled without destruction of the transducer, whereby diaphragms may be changed and the range of the instrument changed or a damaged or corroded diaphragm replaced.

In certain of the prior art transducers of the indicated type, the outer, generally annular, portion of the diaphragm was subjected to inward creeping incident to elastic deformation or bowing of the inner or central portion of the diaphragm under the influence of fluid under pressure admitted to the diaphragm. Such creeping causes subsequent indications of pressures to be in error to an extent dependent upon the extent of creeping. In other prior art pressure transducers of the noted type, linear deflection of the diaphragm under the influence of applied pressure was not attained because of radial distortion akin to the aforementioned radial slipping, but differing therefrom because the distortion was elastic in character. Also, in prior art transducers in which deflections of a paramagnetic diaphragm under influence of fluid pressure were used to vary the magnetic reluctance of inductive devices closely facing but spaced from the diaphragm, admission of fluid under pressure to the transducer tended to move apart the inductive devices, the pressure of the fluid being applied as well to the inductive device as to the diaphragm. Such relative movements obviously change the reluctance of the inductive devices and thus are a source of error in output indications. The present invention provides a structure which precludes any significant occurrence of both inward creeping of the annular peripheral portion of the diaphragm and inward or radial elastic deformation. Further, the present invention provides means whereby detrimental movement apart of opposed inductive means incident to admission of fluid under high pressure into the transducer, is avoided; and thereby the accuracy of the indications furnished by the transducer is meritoriously increased. These meritorious and novel results are attained according to the invention, in part by providing integral with the central resilient pressure-sensing portion of the diaphragm, a relatively rigid encircling annular portion or annulus so proportioned and so connected to the diaphragm-supporting structure that inward movement of the outer portion of the diaphragm is precluded or held to an insignificant movement, whereby the deflections of the pressure-sensitive inner portion of the diaphragm device are linear within a very narrow error band. The noted annulus or peripheral cylindrical ring of the diaphragm device is provided at each of its annular ends with a series of concentric thread-like grooves and ridges or lands; and the annulus is clamped or tightly gripped between two members that are each provided with an annular series of concentric thread-like grooves and lands that are each closely complementary to a respective one of the series of such grooves and lands of the diaphragm devices. The members between which the diaphragm device is thus gripped are formed with opposed faces that are brought into opposed juxtaposition with the diaphragm device therebetween, and are so formed or shaped relative to the diaphragm device as to provide therebetween a chamber that is divided into two smaller chambers by the innterposed diaphragm. Fluid under pressure is admitted to at least one of the smaller chambers (and preferably but not necessarily to both) by suitable means provided for the purpose, and signal means are arranged to utilize deflection movements of the diaphragm to produce pressure-representing signals for transmission to another site. The diaphragm-gripping members, each being thus subject to exposure to the pressure exhibited by the fluid admitted to a respective smaller chamber, and thus tending to be forced apart and out of gripping relationship with the diaphragm device, are according to the invention appropriately "preloaded" or forced toward each other with a loading force in excess of the maximum expected opposing force exerted by the admitted fluid or fluids. Thus the holding relationship of the gripping members to the diaphragm device is not adversely affected by the forces exerted by admitted fluid. Further according to the invention the mating annular thread-like grooves and ridges formed on a face of one of the diaphragm-gripping members and the complementary annular surface of the end face of the annulus of the diaphragm device are carefully formed so that when brought into mating contact the complementary surfaces will provide an effective fluid-tight seal or juncture whereby admitted fluid will not undesirably escape from the transducer. The sealing action may be enhanced, if desired or if found to be necessary in instances, by application of a thin layer or coating of a ductile material (e.g., gold) on one or more of the lands and grooves. The assembled diaphragm device and gripping members are brought into tightly forced-together relation and are there held by suitable means, as for example, by being pressed into a cylindrical housing under great force and held in relative positions by clamping means or by welding or brazing of one or more junctures of the captive members with the housing.

The preceding brief general description of the invention makes it evident that it is a principal object of the invention to provide improvements in diaphragm-type pressure transducers.

It is another object of the invention to provide an improved diaphragm device for a pressure transducer.

Another object of the invention is to provide improved means for holding diaphragm devices in pressure transducers.

An additional object of the invention is to provide improvements in means for preventing undesirable or detrimental deformation of a diaphragm in a pressure transducer.

Another object of the invention is to provide improvements in means for preventing slipping of a pressure-sensitive diaphragm relative to the structure supporting the diaphragm.

Other objects and advantages of the invention will hereinafter be stated or made evident in the appended claims and the following description of a preferred exemplary illustrative pressure transducer incorporating the principles of the invention, as portrayed in a principal embodiment and a modified form all illustrated in the accompanying drawings.

In the drawings:

FIGURE 1 is a top view of the noted exemplary pressure transducer incorporating the novel features and principles of the invention, to an arbitrary scale;

FIGURE 2 is a view in elevation, partly in section, to an enlarged scale, portraying internal details of the transducer depicted in FIGURE 1, the section being taken on a plane and in a direction indicated by the broken line 2—2 in FIGURE 1;

FIGURE 3 is an enlarged transverse sectional view of a portion of the transducer depicted in FIGURE 1, taken as indicated by the arrows and broken line 3—3 of FIGURE 2, but with a portion of a diaphragm device removed to better show details of structure;

FIGURE 7 is a schematic diagram useful in explaining one feature of the invention.

Figure 4:
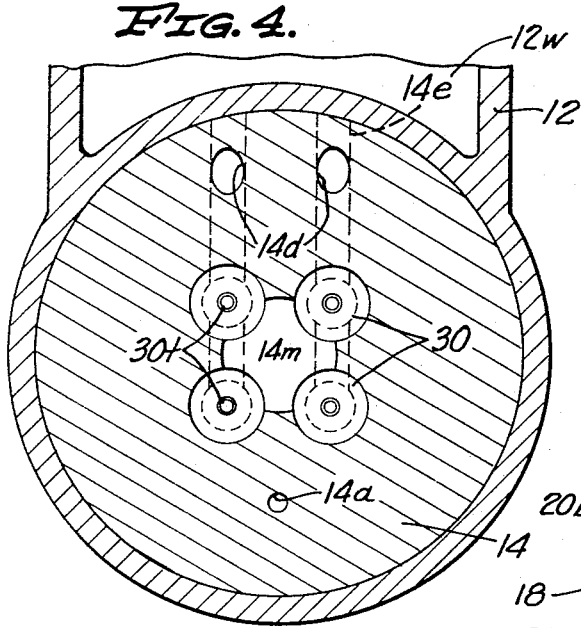
FIGURE 4 is an enlarged transverse sectional view of a portion of the transducer depicted in FIGURE 1, taken in a direction and on a plane indicated by broken line 4—4 of FIGURE 2.

Referring to the drawings and first to FIGURES 1 and 2, the exemplary illustrative pressure transducer, designated generally by numeral 10, comprises a body structure including housing means provided principally by a shaped shell 12 and first and second body members 14 and 16, which body members may be of substantially identical construction. As is indicated in FIGURES 2 and 3, the body members 14 and 16 are of generally cylindrical cross section with formed ends as indicated, and are disposed with inner faces in opposed confronting relationship and closely confined in a cylindrical through-bore 12t provided in housing shell 12, and with a diaphragm device 18 disposed between their inner faces.

Figure 5:
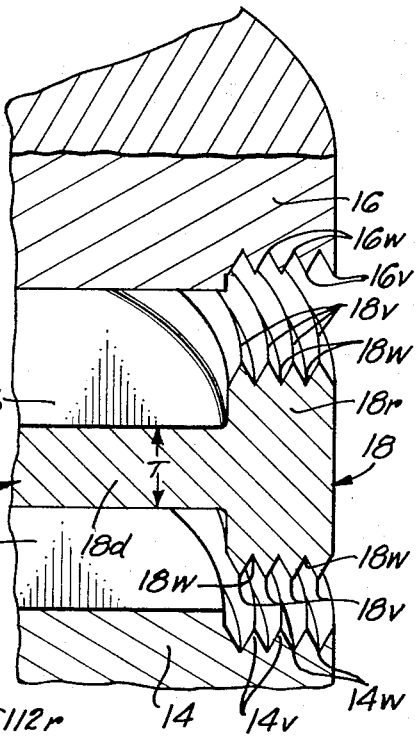
FIGURE 5 is an enlarged isometric or pictorial view of a portion of the diaphragm of the transducer depicted partly in section in FIGURE 2, with a portion of the diaphragm cut away to illustrate details, with fragments of adjacent structures.

As is indicated in FIGURES 2, 3 and 5, diaphragm device 18 consists of an outer annulus or ring portion 18r encircling and integral with a resilient pressure-sensitive diaphragm consisting of a central portion 18d. The ring portion 18r is symmetrical with respect to portion 18d, that is, it is connected at its periphery to the midsection of the ring portion, as depicted. The thickness, T, of portion 18d, relative to the diameter thereof, is dependent upon the maximum pressure range to be accommodated by the transducer, the alloy or material employed and the spring constant thereof, and arbitrary specifications to which the transducer must conform, as will be evident to those skilled in the art. The characteristics of annulus 18r will hereinafter be explained in greater detail, but it here may be noted that in any case the annulus must provide a relatively rigid and unyielding support for the resilient deformable central portion 18d of the diaphragm device.

Annulus 18r is, in effect, a cylindrical member having annular end faces, and is proportioned to withstand high axial (longitudinal) compressive forces considerably in excess of the maximum axial force expected to be applied to the diaphragm proper by admitted fluid. Further, it is provided at each of its end faces with a series of annular thread-like formations which as shown are annular ridges or lands 18v separated by intervening annular grooves 18w. Preferably, but not necessarily, the tops of the ridges are ground away to provide narrow flat faces, for clearance and to avoid binding, as will be understood by those skilled in the mechanical arts. The thread-like annular formations may be, and preferably are, alike on the two end faces; and the formations are carefully formed to provide smooth accurate surfaces for the purpose previously noted. The diaphragm device 18 and the inner ends of body members 14 and 16 are so formed as to provide between the ends of the body members a space or chamber 20 that is divided and reduced by the diaphragm into two smaller chambers 20a and 20b. The latter chambers provide space for access of fluid under pressure to respective faces of the pressure-sensitive central portion of the diaphragm device, and to permit elastic deformation of the diaphragm proper in either axial direction under the influence of a difference between the pressures of the fluids in the chambers.

As is best shown in FIGURE 5, the two body members 14 and 16 are also formed to present on their opposed inner faces respective annular thread-like formations 14v, 14w and 16v, 16w, respectively, that are complementary to and very closely fit respective annular formations on the ends of annulus 18r. The very close interfitting of the annular formations of the body members with those of the diaphragm annulus requires careful machining of the parts in producing the formations; and in those instances wherein it is desirable or necessary, as when very high fluid pressures are to be sensed, the interfitting parts may be lapped to provide a superior close fit of the parts. Further, in some instances, as where very high pressures are to be sensed or as where certain types of fluids are to be admitted to the transducer, the interior surfaces, including the annular thread-like formations, may be plated with a suitable ductile material such as gold. Thereby the fluid-tightness of the junctures, and corrosion-resistance of the parts, are enhanced.

Admission of fluid under pressure to chamber 20a is by way of intercommunicating bores 14a, 14b and 14c provided in body member 14 as shown in FIGURE 2, the outer end of bore 14b being plugged as shown by suitable means such as by brazing or welding. Admission of fluid into bore 14c is facilitated by providing at the end of body member 14 a suitable fluid connection, which in the illustrated embodiment is a threaded male pressure fitting 14f. Admission of fluid to the opposite chamber 20b is similarly effected by way of bores 16a, 16b and 16c similarly provided, the latter bore being provided in a pressure fitting 16f. As will be evident to those skilled in the art, the resilient central portion 18d of diaphragm device 18 will be flexed when there is a difference between the pressures exhibited by the fluids admitted to chambers 20a and 20b, and the direction or sense of the flexing or deformation will depend upon which of the fluids exhibts the higher of the two pressures. Elastic flexing or distortion of the diaphragm 18d occurs to an extent depending upon the noted pressure differential; and it is, according to the invention, substantially within a very narrow error band because of the novel way the active pressure-sensing portion of the diaphragm device is supported.

Elastic deformation or axial movement of the diaphragm 18d is susceptible of being sensed in a variety of ways by several forms of means, but in the illustrated preferred embodiment of transducer the diaphragm is paramagnetic and is contained in the magnetic fields of a set or pair of electromagnetic devices. The arrangement is such that the reluctance of the magnetic flux path of one device is lessened and that of the flux path of the other device is increased, incident to elastic deformation of the diaphragm under the influence of a pressure differential existing in the fluids admitted to opposite sides or faces of the diaphragm. The two magnetic devices, each for and disposed in a respective one of the body members, are essentially opposed twins. Accordingly, only that device disposed in body member 14 will be described. Referring to FIGURES 2 and 3, body member 14 is provided with a shaped centrally positioned recess which is conveniently provided by an axial bore 14m and four overlapping satellite bores 14n, 14o, 14p and 14q which latter bores are somewhat deeper than the axial bore, as indicated. An inductive device, comprising an E-core 24 bearing windings or coils including, for example, a primary coil 26 and a secondary coil 28, is disposed in the recess. Sealed in each of the satellite bores is a respective one of four insulated lead through terminal devices such as 30 each having a terminal such as 30t (FIGURE 3). The terminal devices are fusion sealed to walls of the respective bores, as by soldering; and each has connected thereto a respective one of insulated conductors 30c (FIGURE 2). The insulated conductors are brought out into a connector well 12w provided in housing shell 12, by way of intercommunicating lateral bores such as 14d, 14e, of each of which bores there are two provided in member 14 (see FIGURE 4) and which bores intersect or intercommunicate with respective ones of the satellite bores and with each other as indicated. Desirably but not necessarily, the conductors such as 30c are adhesively held in place in the bores, by self-curing compound (not shown) which may be introduced in the bores prior to assembly of the body member in the housing shell 12.

Following sealing-in of the terminal devices 30, leads such as 26a, 28a (FIGURE 3) from the primary coil 26 and secondary coil 28 are connected to the inner end of a respective one of the lead through terminals, and the inductive device comprising core 24 is fitted into the recess in the body member and potted therein using conventional potting techniques and materials. Care is exercised that the end faces of the legs of the core are disposed coplanar with the adjacent encircling inner face of body member 14.

Following completion of the assembly of body member 14 and appurtenances, and of its opposing twin including body member 16, the conductors such as 30c are drawn into the bore 12t and through lateral openings communicating with connector well 12w as shown in FIGURE 2, and the body members are entered into respective ends of the bore of the housing shell and into mating contact with diaphragm device 18. The body members are brought into proper relative position under great force, as by being mounted in press means, and then while still being thus pressed are fusion-united around respective peripheries to shell 12, as indicated at 14x, 16x. Thus the two body members, which are preferably substantially identical or alike, are maintained in proper juxtaposition and each exerting strong compressive forces on the annulus 18r of the diaphragm.

It is evident that upon admission of fluid under pressure into either of chambers 20a, 20b, the admitted fluid will exert an outwardly-directed force on the inner face of the respective body member assembly, tending to force that body member away from the diaphragm. In prior art diaphragm-type pressure transducers, that fluid-exerted force in certain cases was such as to relax the peripheral grip on the diaphragm and permit inward migration of the annular outer or rim portion of the diaphragm as the latter was deflected or elastically deformed by the pressure exerted by the fluid. Such migration or creeping of the diaphragm was responsible for inaccuracy and widening of the error band of the instrument. As is evident, in the case of the present invention, the force tending to hold each body member in contact with the diaphragm device is always considerably greater than the oppositely directed force exerted by an admitted fluid and hence there is no tendency for separation to occur between either body member and the diaphragm device. Further, by virtue of the strong rigid annulus 18r, and the series of interengaging annular thread-like formations or corrugations of the body members and annulus 18r, any tendency of the central portion 18d of the diaphragm device to partake of other than linear elastic axial distortion incident to application of pressure by an admitted fluid is entirely avoided. Thus, except for internal hysteresis effects within the material of the diaphragm 18d, the elastic deformations of the diaphragm are substantially purely linear even when the pressure-differential passes from a high positive value through zero to a high negative value.

The axial dimension or "depth" of chambers 20a and 20b may vary, being dependent upon the expected maximum deflection of the diaphragm and the desired characteristics of the magnetic circuits of the inductive devices. The gaps between faces of the inductive devices and the diaphragm are shown exaggerated to facilitate illustration. In an exemplary transducer in which diaphragm 18d is 0.7 inch diameter and 0.08 inch thick and the diaphragm device 18 is of 0.9 inch diameter, the gap or separation is of the order of 0.001 inch; however, as will be evident to those skilled in the pertinent art, the dimensions may vary widely without departure from the true spirit and scope of the invention. However, proportioning of the annulus 18r relative to the dimensions and expected deflection of the diaphragm 18d will always be such as to avoid detrimental or objectionable deformation of the annulus in a manner indicated in exaggerated form in FIGURE 7, wherein due to the relatively large length L and small width W of the annulus 18r' (relative to diaphragm 18d'), deflection of the diaphragm under pressure of admitted fluid is such as to cause distortion or buckling of the annulus and inward migration of the outer portion of the diaphragm proper.

The electrical leads or conductors such as 30c may be used directly as terminal connections to the inductive devices, or alternatively each may be connected to a respective terminal such as 60t (FIGURE 1) of a conventional electrical connector member 60 that is attached as indicated to housing shell 12 above well 12w (FIGURE 2). The electrical operation of the inductive devices and the external circuitry associated therewith are well known in the electrical and electronic arts and are per se not part of the present invention and are accordingly not here further explained nor described.

Figure 6:
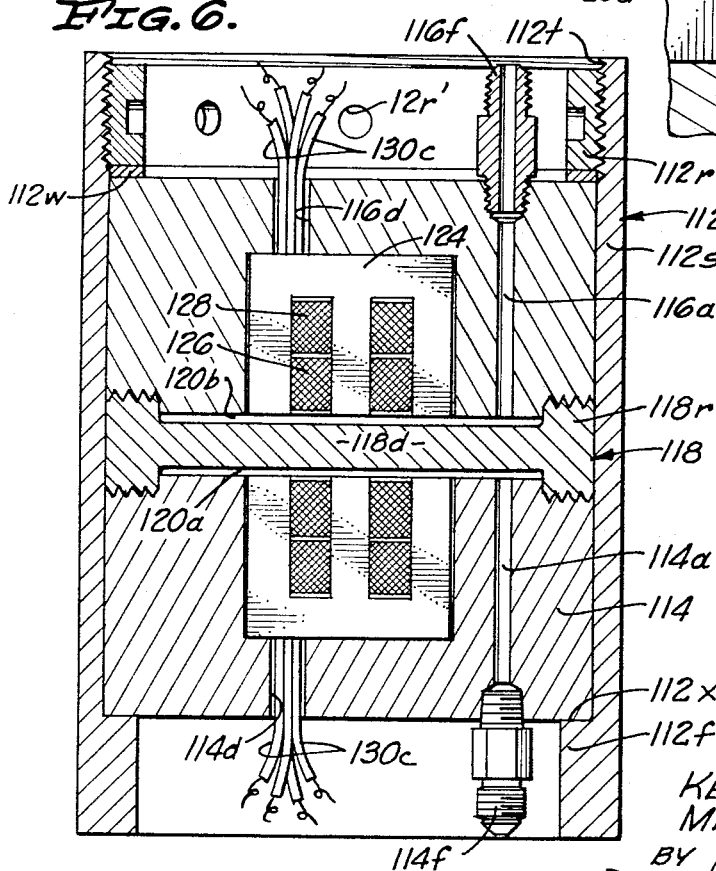
FIGURE 6 is a partly diagrammatic enlarged sectional view illustrating principles of the invention as embodied in a modified form of transducer structure employing the novel diaphragm device of the pressure transducer depicted in FIGURES 1–5.

In FIGURE 6 is illustrated a modified form of pressure transducer incorporating principles of the invention. Therein a pressure-sensitive diaphragm device 118 that is substantially the same as device 18 previously described, is disposed between opposed substantially identical body members 114 and 116 each of which is provided with an annular formation of thread-like formations that mates with a complementary formation provided on the rim or annulus 118r of the diaphragm device, as shown. The thread-like formations may be in the form of complementary spiral threads, or may be similar to the annular formations previously described. Each of the body members has mounted in a recess therein an inductive device, both of which may be alike or similar and each comprising an E-core such as 124 and primary and secondary coils such as 126 and 128, respectively. Each inductive device may be potted and sealed in the respective body member, and is provided with primary and secondary terminal connections or conductors such as 130c, which make exit through a respective one of bores 114d, 116d. The diaphragm device and the body members are formed to provide when assembled a chamber that is divided by the diaphragm into smaller chambers 120a, 120b, into which fluid under pressure is admissible by way of respective passages 114a, 116a and fluid connectors 114f, 116f, in a manner now evident and as indicated.

Continuing with reference to FIGURE 6, the operative assembly of the diaphragm device 118 and the two opposed alike body members 114 and 116 and appurtenances is brought together and held with the annulus 118r of the diaphragm device under high compressive forces, by means of a housing means or device 112. Housing device 112 consists essentially of a cylindrical shell 112s provided at one end with a strong internal flange 112f providing an annular step 112x, and at the opposite end with internal threading 112t. The stacked operative assembly of body members 114, 116 and interposed diaphragm device 118 is pressed into the bore of shell 112s, with body member 114 brought into seating disposition on step 112x as shown. The assembly is forced together with great force, preferably with the aid of press means, and is held with annulus 118r under high compressive forces by an internal ring nut 112r and associated ring washer 112w. As is evident to those skilled in the art, if the diaphragm device and opposed body members are provided with mating spiral thread formations, the diaphragm 118d may be placed under a certain amount of radial tension by suitable relative rotation of the body members; and in that way performance of the diaphragm and efficacy of the fluid-tight seals or junctures of annulus 18r with the body members may be enhanced. In other details and respects, and in operation, the modified form of transducer depicted in FIGURE 6 may be like or similar to those of the principal preferred embodiment depicted in FIGURES 1–5.

The preceding description and explanation in detail of a preferred form of pressure transducer according to the invention evidences complete attainment of the aforementioned objects of the invention. As will be evident, in the light of the present disclosure changes within the true spirit and scope will occur to those skilled in the art and accordingly it is desired that the scope of the invention be not restricted to exact details of the preferred embodiment described except as may be required by the appended claims.

We claim:
1. A pressure transducer comprising:
   first means, including a diaphragm device having a resilient central diaphragm portion adapted to elastically deform under the influence of force thereagainst exerted by a fluid under pressure and a rigid cylindrical ring-like annulus having generally annular end faces and intermediate the end faces said rigid cylindrical ring-like annulus being integral with and encircling said diaphragm portion, at least one of the end faces of said annulus bearing an annular formation of thread-like character;
   second means, including a body member having an annular end face presenting a formation of thread-like character complementary to and closely fitting said annular formation of said diaphragm device, said second means having a surface spaced from said diaphragm portion of said diaphragm device to provide a chamber therebetween and said second means having provisions for admission of fluid under pressure into said chamber for causing elastic deformation of said diaphragm portion to an extent proportional to the pressure differential existent at opposite faces of said diaphragm portion;
   third means, including means engaging and holding said body member and said diaphragm device in relative juxtaposition with the annular thread-like formations thereof interengaged, and said third means exerting large compressive forces on said annulus at said formation of thread-like character whereby a fluid-tight juncture therebetween is formed around said chamber and whereby radial inward migration of the periphery of said resilient diaphragm portion of said diaphragm device is prevented; and
   fourth means, including means for sensing and translating pressure-induced elastic deformations of said resilient central diaphragm portion into electrical signals incident to admission of fluid under pressure into said chamber.

2. A pressure transducer as defined by claim 1, including in said third means a second body member which has a surface spaced from said diaphragm device to provide a second chamber at the opposite face of said diaphragm from said first noted chamber, and said second body member having provisions for admission of fluid under pressure to said second chamber, whereby said resilient diaphragm portion of said diaphragm device is sensitive to the difference between the pressures exhibited by the respective fluids admitted to said second chamber and said first noted chamber.

3. A pressure transducer as defined by claim 2, in which said diaphragm device is paramagnetic and said fourth means comprises first and second electromagnetic inductive devices each comprising a magnetic core and associated coil means and each disposed in a respective one of said body members with a portion of the core thereof closely adjacent to said central diaphragm portion of said diaphragm device, whereby elastic deformations of said diaphragm portion incident to changes of a difference in the pressures exhibited by said fluids cause respective changes in the magnetic reluctances of said inductive devices.

4. A pressure-transducer according to claim 3, in which said means engaging and holding said body members is a cylindrical housing shell having a bore in which said diaphragm device and said body members are held under compression by tensile stresses maintained in said shell by a threaded retainer comprised in said means.

5. A pressure transducer for accurately translating changes of pressure difference into equivalent electrical signals, comprising:
- a body structure including first and second separable body members each having a respective end face including a portion providing a respective generally annular formation of thread-like character;
- a diaphragm device including a resilient pressure-sensitive central portion presenting oppositely-facing first and second faces and an encircling generally cylindrical annulus of length at least greater than the thickness of said central portion and said annulus having first and second end faces and integrally joining at its inner midsection said central portion and said cylindrical annulus at its end faces provided with respective first and second annular formations of thread-like character each complementary to and closely fitting a respective one of the generally annular formations of thread-like character provided by said body members, said diaphragm device and said body members being shaped to define therebetween respective first and second chambers each bounded in part by a respective one of said first and second faces of said central portion of said diaphragm device and said first and second body members having respective provisions for admitting fluids under pressure to respective ones of said chambers whereby said diaphragm is exposed at its faces to respective ones of the admitted fluids for response to the pressures thereof;
- means for holding said body members with the said annular formations thereof in tight compressive engagement with respective annular formations of said diaphragm device whereby fluid-tight junctures are provided thereat and whereby said resilient pressure-sensitive central portion of said diaphragm device may be elastically deformed by fluid under pressure acting thereon and inward creeping of the peripheral portion of said central portion is prevented by said annulus;
- and translating means including electrical means, responsive to movements of said central portion of said diaphragms device relative to said body members, for translating such movements into equivalent electrical signals representing differences between pressures exhibited by fluids admitted to respective ones of said chambers.

6. A diaphragm device for a pressure transducer, said diaphragm device including an elastic generally disc-like central portion presenting opposite generally circular faces, and said device including a rigid generally cylindrical annulus having first and second ends each presenting an end face and said annulus encircling and integrally joined with said central portion intermediate said first and second ends and said annulus having a length in excess of the thickness of said central portion and said annulus having at each end face thereof a respective generally annular formation of thread-like character, whereby said central portion may be elastically distorted by a difference in pressures of fluid applied to opposite faces thereof without significant radial distortion and whereby said annulus can be effectively sealed at either of said end faces by application thereto around the extent thereof of high compressive stress.

7. A pressure transducer, comprising:
- first means, including a diaphragm device having first and second ends and having a generally flat circular resilient central portion having first and second opposite faces and said central portion being adapted to flex from a normal attitude in response to differences between forces exerted by fluids under pressure admitted to respective ones of the opposite faces thereof, said diaphragm device having a generally cylindrical substantially rigid rim portion having first and second ends and said rim portion intermediate the said ends being integral with and encircling said resilient central portion, said rim portion having on the first end thereof an annular face presenting a thread-like formation extending all the way around the said first end, and said rim portion being of such rigidity as to prevent significant inward creeping of the periphery of said resilient central portion of said diaphragm device;
- second means, including at least a first body member, said first body member having an end presenting a shaped end face configured to be complementary to said first end and annular face of said diaphragm device to form therewith a chamber in which said first face of said circular resilient central portion of said diaphragm is exposed, said shaped end of said body member having thereon a thread-like formation complementary with and closely fitting the said thread-like formation on said first end of said rim portion of said diaphragm device whereby to form therewith a separable fluid-tight juncture of said diaphragm device with said first end of said body member around the periphery of said chamber at said thread-like formations, and one of said first and second means having provision for admission of fluid under pressure into said chamber;
- third means, including releasable means serving to hold said body member and said diaphragm device in mating juxtaposition under great compressive strain whereby to maintain said fluid-tight juncture therebetween at said thread-like formations and prevent separation at said juncture under the action of fluid under pressure admitted to said chamber, while permitting ready separation thereof following release of said releasable means;
- and fourth means, including means sensitive to deflection of said central resilient portion of said diaphragm device incident to difference of pressures exhibited at the opposite faces thereof, for producing physical indications representative of that difference.

8. A pressure transducer according to claim 7, in which said diaphragm device is provided at the second end of said rim portion with a second thread-like formation, and in which said second means includes a second body member similar to said first body member and complementary to the second face and second end of said diaphragm device and providing therewith a second chamber with provisions for admission of fluid under pressure to said second chamber, and in which said releasable means of said third means holds said first and second body members with said diaphragm device interposed therebetween and under great compressive strain sufficient to maintain fluid-tight junctures around both said chambers and to prevent separation of said second body member from said diaphragm device under the action of the pressure exerted by fluid admitted under pressure to said second chamber, while permitting ready separation of said diaphragm device from said second body member following release of said releasable means.

References Cited
UNITED STATES PATENTS

| | | | |
|---|---|---|---|
| 2,300,722 | 11/1942 | Adams et al. | 92—98 XR |
| 2,641,742 | 6/1953 | Wolfe et al. | |
| 2,679,760 | 6/1954 | Harland et al. | 92—98 |
| 2,683,989 | 7/1954 | Clark | 73—398 |
| 3,043,338 | 7/1962 | Hanson | 92—98 |

DAVID SCHONBERG, *Primary Examiner.*

LOUIS R. PRINCE, *Examiner.*

D. O. WOODIEL, *Assistant Examiner.*